(12) United States Patent
Palmer

(10) Patent No.: US 6,189,555 B1
(45) Date of Patent: Feb. 20, 2001

(54) VALVE ARRANGEMENTS FOR CLEANING THE INTERIOR OF A VALVE MEMBER

(75) Inventor: Thomas Palmer, Nottingham (GB)

(73) Assignee: Hygienic Pigging Systems Limited (GB)

( * ) Notice: Under 35 U.S.C. 154(b), the term of this patent shall be extended for 0 days.

(21) Appl. No.: 09/007,640

(22) Filed: Jan. 15, 1998

(30) Foreign Application Priority Data

Jan. 17, 1997 (GB) .................................................. 9700950

(51) Int. Cl.[7] ....................................................... F16K 5/06
(52) U.S. Cl. ............................ 137/15; 137/237; 137/268
(58) Field of Search .............................. 137/268, 15, 237, 137/238, 242, 246; 15/104.061, 104.062, 104.05

(56) References Cited

U.S. PATENT DOCUMENTS

| 2,070,517 | * | 2/1937 | O'Leary ............................ 137/238 X |
| 3,392,920 | | 7/1968 | Gagliardo . |
| 3,473,550 | * | 10/1969 | Scoy et al. ............................ 137/268 |
| 4,757,834 | | 7/1988 | Mieth . |
| 5,305,986 | | 4/1994 | Hunt . |
| 5,311,904 | | 5/1994 | Beppu . |
| 5,467,796 | | 11/1995 | Pettinaroli et al. . |

FOREIGN PATENT DOCUMENTS

| 3246622A1 | 7/1984 | (DE) . |
| 1200203 | 10/1967 | (GB) . |

OTHER PUBLICATIONS

U.K. Search, GB 9700950.0, Nov. 12, 1997.
European Search Report for Application No. EP 98 30 0283; dated Oct. 21, 1999.

* cited by examiner

Primary Examiner—Kevin Lee
(74) Attorney, Agent, or Firm—Watts Hoffman Fisher Heinke Co LPA

(57) ABSTRACT

A valve arrangement is provided for connecting first and second conduits. The valve arrangement comprises a valve member mounted in a socket for movement between a first condition and a second condition. In the first condition, the valve member communicatively connects the first and second conduits. In the second condition, the valve member communicatively connects the first conduit to the interior of the socket. When the valve member is in the second condition, cleaning fluid can be passed along the first conduit to clean inside the socket.

6 Claims, 4 Drawing Sheets

VALVE ARRANGEMENTS FOR CLEANING THE INTERIOR OF A VALVE MEMBER

FIELD OF THE INVENTION

The present invention concerns valve arrangements and in particular valve arrangements for connecting conduits.

DESCRIPTION OF THE PRIOR ART

There are many known designs of valve for providing selective communication between two conduits. Many of these provide for movement of a valve member between the conduits to selectively open and close communication between the conduits. One such type of arrangement comprises a ball valve in which a ball is located within a socket connectable between conduits, which ball comprises a passage therethrough which provides for selective connection of the conduits by rotation of the ball to align the passage with the conduits or remove it from alignment to cut off connection One disadvantage of known ball valve arrangements is that the socket is prone to contamination, particularly in situations where material is conveyed between the conduits, through the valve arrangement. Such contamination can hinder effective operation of a valve arrangement. Moreover, contamination can be a serious problem for example if the conduits are conveying foodstuffs or other material in which contamination by impurities is not acceptable or desirable.

One known attempt to overcome this problem is to deliver pipe cleaning fluid to the interior of the socket along secondary conduits. However such secondary conduits require a not inconsiderable amount of space around the socket, which space may not be available in certain environments. Further, the provision of such further conduits introduces undesirable expense. cl SUMMARY OF THE INVENTION It is therefore an object of the present invent to obviate or mitigate one or more disadvantages of the prior art.

According to the present invention there is provided a valve arrangement for connecting first and second conduits, the arrangement comprising a valve member mounted in a socket for movement between a first condition in which the valve member communicatively connects the first and second conduits and a second condition in which the valve member communicatively connects the first conduit to the interior of the socket such that cleaning fluid can be passed along the first conduit to clean inside the socket.

Preferably the valve member defines a connecting passage which provides for the aforesaid communicative connection. The valve member may be rotatably movable within the socket, which socket may comprise one or more bearing surfaces and/or seals acting on the valve member to support movement of the valve member in the socket. Preferably the operative surface(s) of each of the seals and/or the bearing surface(s) are cleaned when cleaning fluid is supplied to the socket.

Preferably the passage sealingly aligns with the first and second conduits when in the first condition whereby to provide for substantially sealed communication for the passage of liquid therethrough between the conduits. The passage may not be aligned with the first conduit when in the second condition.

The valve arrangement may provide for selective communication of a third conduit with one or both of the first and/or second conduits. Preferably the third conduit is isolated from the first and second conduits when the valve member is in the first condition. Preferably the third conduit is in communication with the first conduit when the valve arrangement is in the second condition. The passage may not be fully aligned with either of the first and third conduits when in the second condition, but off-set to provide for said communication with the interior of the socket. The second conduit is preferably isolated when the valve member is in the second condition.

Preferably the third conduit comprises a chamber which chamber is cleaned by cleaning fluid provided from the first conduit when the valve member is in the second condition. Preferably the chamber provides storage for a conduit cleaning device, often termed a pig, whereby the chamber and a device stored therein can be cleaned when the valve member is in the second condition.

Preferably the socket is arranged such that fluid fed therein can circulate therearound to facilitate cleaning. The socket may comprise a selectively openable outlet for the release of cleaning fluid therefrom, desirably following completion of cleaning.

The valve member may be movable to a third condition in which the passage communicatively connects the second and third conduits, desirably sealingly for the passage of fluid therethrough between the second and third conduits. The passage is preferably arranged to allow a conduit cleaning device stored in the third conduit to pass to the second conduit to evacuate material from the second conduit according to known pigging techniques.

Preferably the valve arrangement provides for sequential cleaning of the seal/bearing surfaces during movement of the valve member between two or more of the aforesaid conditions.

Preferably the arrangement is electrically or pneumatically actuated. Alternatively or additionally the valve arrangement may be manually movable between said conditions. A gap may be provided on the valve arrangement to provide for manual gripping thereof and selective movement of the valve member.

According to a further aspect of the present invention there is provided a pipeline comprising a valve arrangement substantially as described in any of the preceding nine paragraphs.

BRIEF DESCRIPTION OF THE DRAWINGS

An embodiment of the present invention will now be described by way of example only, with reference to the accompanying drawings, in which.

DETAILED DESCRIPTION

Figure 3:
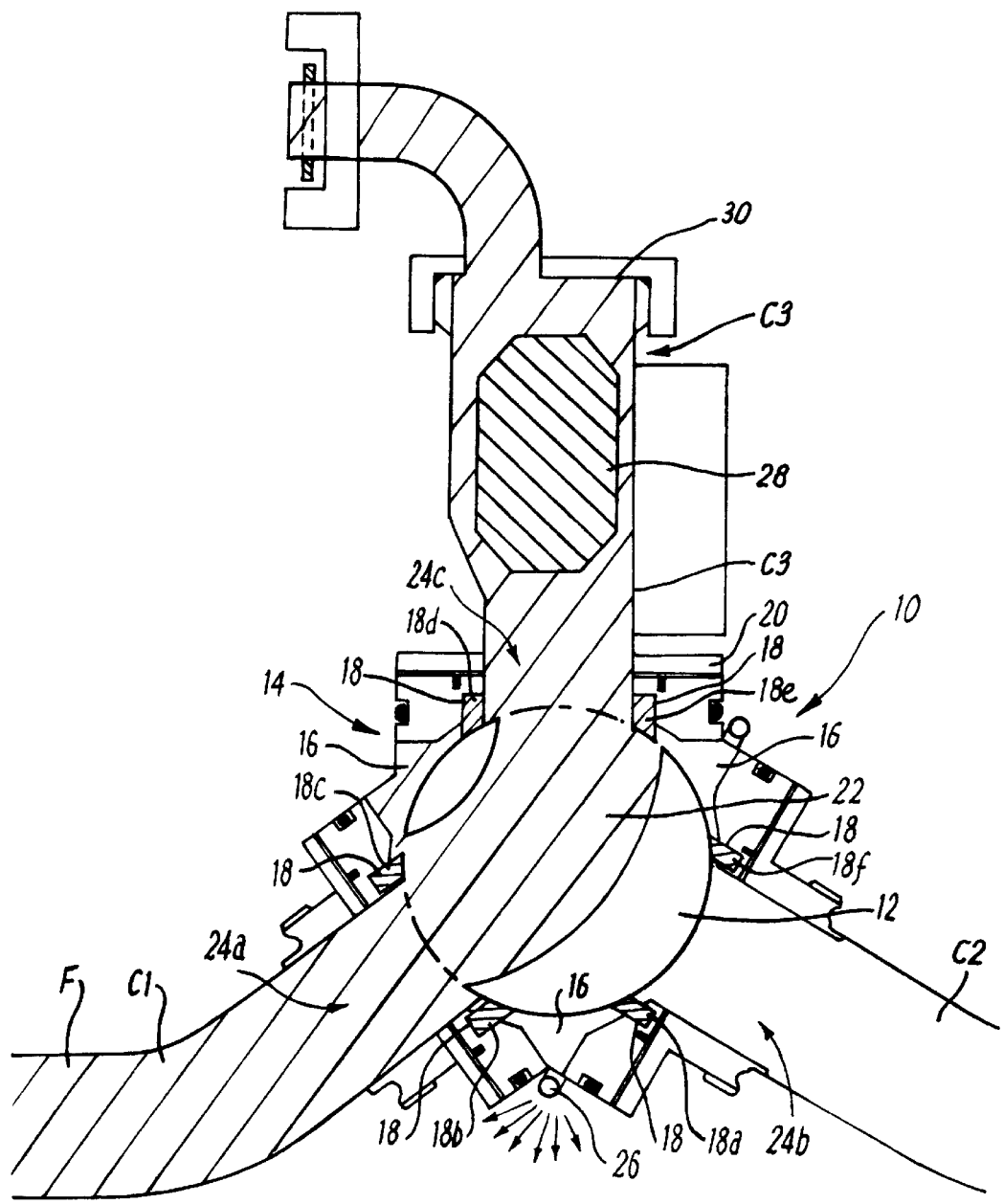
FIG. 3 is a cross-sectional view of the valve arrangement of FIG. 2 in a second condition.

Referring to FIGS. 2 to 5, a valve arrangement 10 for connecting first and second conduits C1,C2 comprises a valve member 12 mounted in a socket 14 for movement between a first condition (FIG. 2) in which the valve member 12 communicatively connects the first and second conduits C1,C2 and a second condition (FIG. 3) in which the valve member 12 communicatively connects the first conduit C1 to the interior 16 of the socket 14 such that cleaning fluid F depicted black in FIG. 3 can be passed along the first conduit C1 to clean inside the socket 14.

In more detail, the valve member 12 is rotatably mounted on bearing seals 18 for rotatable operation within the socket 14. The socket 14 preferably encases the valve member 12 within an outer casing 20 which casing 20 defines a generally sealed interior 16 of the socket. An angled passage 22 extends through the valve member 12, generally through an angle of 120°. The outer casing 20 comprises three inlets 24a,b,c to the valve arrangement 10. The first conduit C1 is sealingly connected to one of said inlets 24a, the second conduit C2 is sealingly connected to the second inlet 24b, and a third conduit C3 is sealingly connected to the third inlet 24c. The inlets 24a,b,c are disposed symmetrically about the socket 14 whereby to be displaced generally 120° apart in the direction of operable rotation of the valve member 12.

Means (not shown) to provide for selective movement of the valve member 12 in the socket 14 is provided, which means may be a manually manipulable formation, such as a flange outside the socket, or alternatively may be electrically or pneumatically operable. Means connecting the member 12 and formation sealingly extends through the casing 20.

Figure 4:
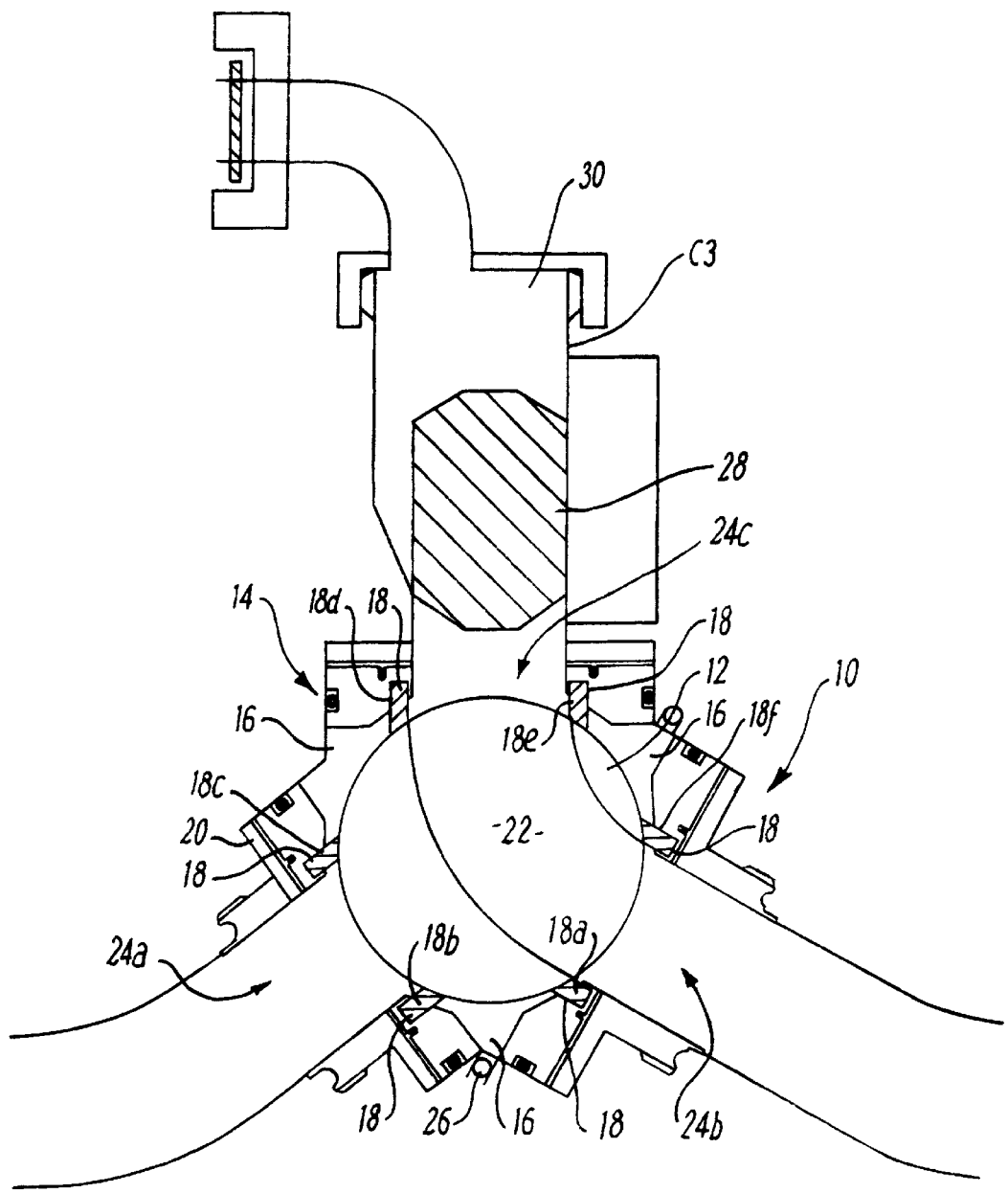
FIG. 4 is a diagrammatic cross-section of the valve arrangement of FIG. 2 in a third condition.

As well as movable between the aforesaid first and second conditions, the valve member is also movable to the third condition shown in FIG. 4, in which the passage 22 provides sealed communication between the conduits C3 and C2 whereby to provide for passage of fluid, and particularly liquid between the conduits C2,C3 as will be explained. Similarly when the valve member 12 is in the first condition, the passage 22 sealingly connects the first conduit C1 with the second conduit C2 to provide for the passage of liquid between the conduits C1 and C2, as will be explained.

When the valve member 12 is in the second condition as shown in FIG. 3, the passage 22 is not aligned completely between the respective conduits C1 and C3, and thereby provides the communication between the conduit C1 and the interior 16 of the socket 14, as well as communication with the third conduit C3. Selective provision of cleaning fluid F along C1 therefore introduces cleaning fluid F into the interior of the socket 16, the socket being arranged to provide for circulation of the fluid therearound to facilitate cleaning thereof. An outlet 26 is provided in the outer casing 20 to provide for selective opening of the casing to release cleaning fluid from within the socket.

The valve member 12 may be movable to a fourth condition in which the passage 22 is completely aligned between the first and third conduits C1,C3, in which condition C1 is not in communication with the interior 16 of the socket 14, for example when cleaning of the interior 16 of the socket 14 is complete or not required.

It is principally intended that the valve arrangement 10 of the present invention is used in a pipeline as a launch valve for a pipeline evacuating device or pig, shown generally as 28 in the drawings. Such pigs are conventionally used to remove residual material within a pipeline, which pipeline for the purpose of this embodiment is considered to be conduit C2. In use, the valve arrangement 10 is used to sealingly connect the conduits C1,C2,C3. As explained, in this example, C2 is a pipeline comprising material, such as a liquid product, C1 is a product feed conduit comprising a pump 29 (FIG. 5), and C3 comprises a chamber 30 in which a pig 28 is stored for use.

Figure 5:
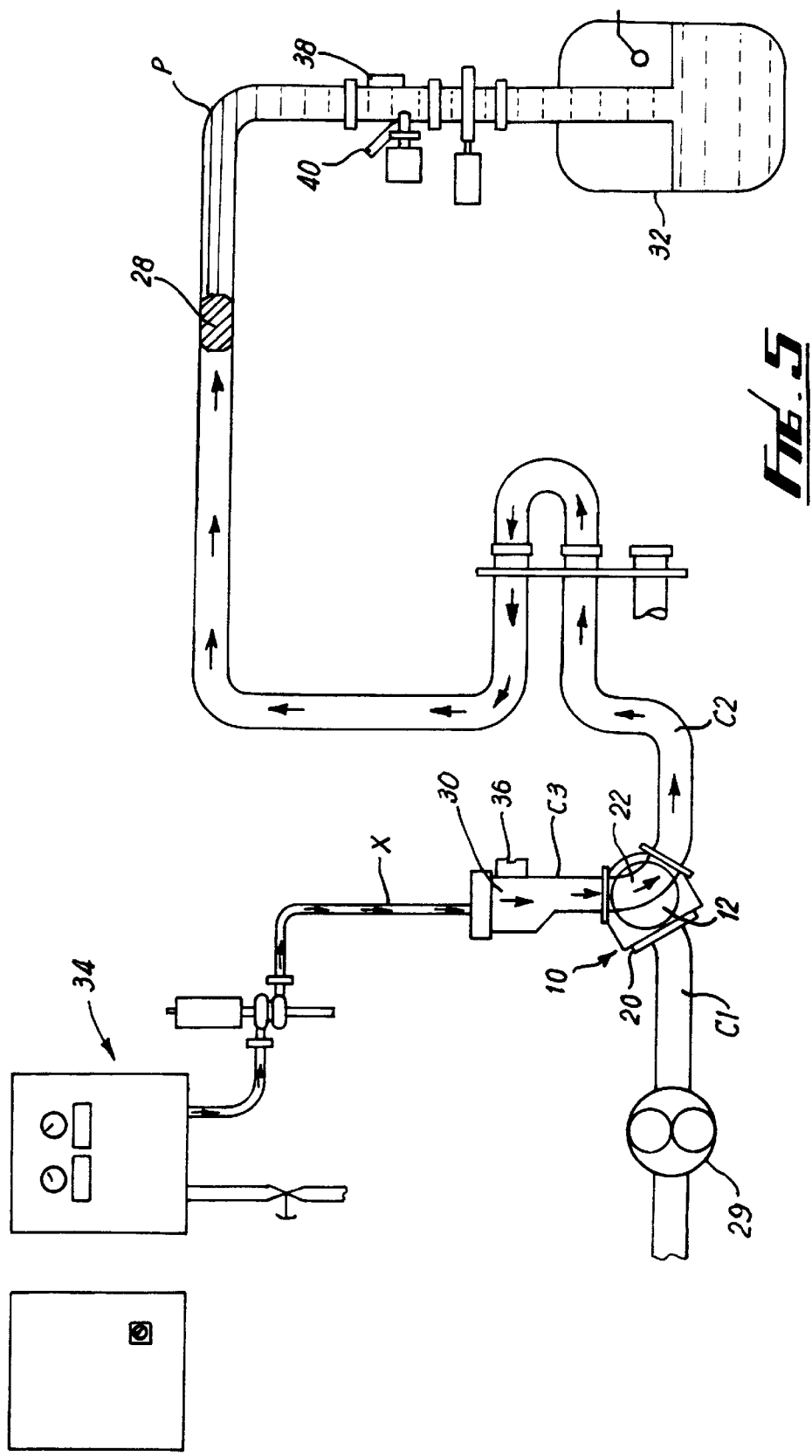
FIG. 5 is a diagrammatic representation of a pipeline comprising the valve arrangement of FIG. 2 in a third condition.

During normal production of liquid product, the valve member 12 is in the first condition, and the pump 29 drives the product along C1, through the passage 22 and along the second conduit or pipeline C2 for collection at its other end in a suitable container 32. When a production run is complete, the valve member 12 may be rotated to the third condition, to communicatively sealingly connect conduits C3 and C2. With the valve member 12 in this condition, a propellant, such as compressed air or pressurised liquid may be fed from a propellant source or controller 34 into the chamber 30 to drive the pig 28 down through the passage 22 and along the pipeline conduit C2, pushing product in front of it out into the container 32 as illustrated in FIG. 5. The propellant source or controller may be one or both of a pneumatic or electrical controller or panel. The small arrows in FIG. 5 indicate the flow of propellant fluid, with the shading indicating the product P. The pig 28 may be magnetic; a detector 36 detects its presence in the chamber 30 and a detector 38 detects the presence of the pig 28 at the end of the conduit C2. Once the pipeline C2 has been evacuated of material P, the pig 28 may be returned to the chamber 30 by means of a return propellant supplied to the conduit C2 via a pipe 40. The valve member 12 may be returned to the first condition, and cleaning liquid pumped along C1, through the passage 22 and along C2 to clean the passage.

To clean the inside of the socket 16 in accordance with the invention, the valve member 12 is rotated to the second condition (FIG. 3) and cleaning fluid F again pumped along C1, through the passage 22 to circulate around the interior 16 of the socket 14 and also up into the third conduit C3. As the valve member 12 is moved from the first to the second condition cleaning fluid is supplied thereto so that as the passage 22 passes the seals 18a,b,c,d the surfaces of those seals are cleaned. When the valve member is in the second condition seals 18c,e are exposed to cleaning fluid. Seal 18f may be cleaned by either rotating the valve member 12 anticlockwise slightly from the first condition whereby to expose the seal 18f to cleaning fluid, prior to moving the member 12 to the second condition, or it can be cleaned as the member 12 is moved clockwise from the second to the third condition. In certain instances a pig 28 may be located in the third conduit C3 thereby also providing for cleaning of the pig. Once cleaning has been effected, the outlet 26 may be opened to remove cleaning fluid from the interior 16. In an alternative, the outlet 26 may be opened during input of cleaning fluid from C1 thereby providing for flushing out of the interior 16 of the socket 14.

In either case, it is desirable to remove the cleaning fluid F from within the interior 16 of the socket 14 following cleaning, and to effect this the cleaning fluid feed F1 is stopped, and the valve member 12 moved to any of the first, third or fourth conditions. Fluid is then allowed to leave the outlet 26.

Figure 1:
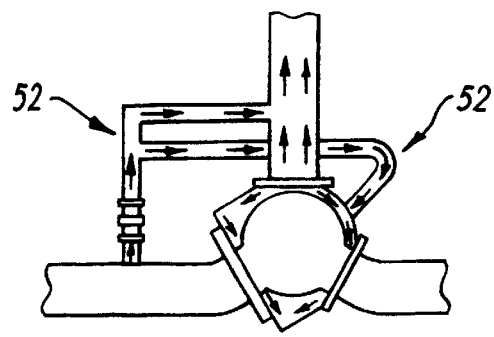
FIG. 1 is a diagrammatic representation of a prior art valve cleaning arrangement.
Figure 2:
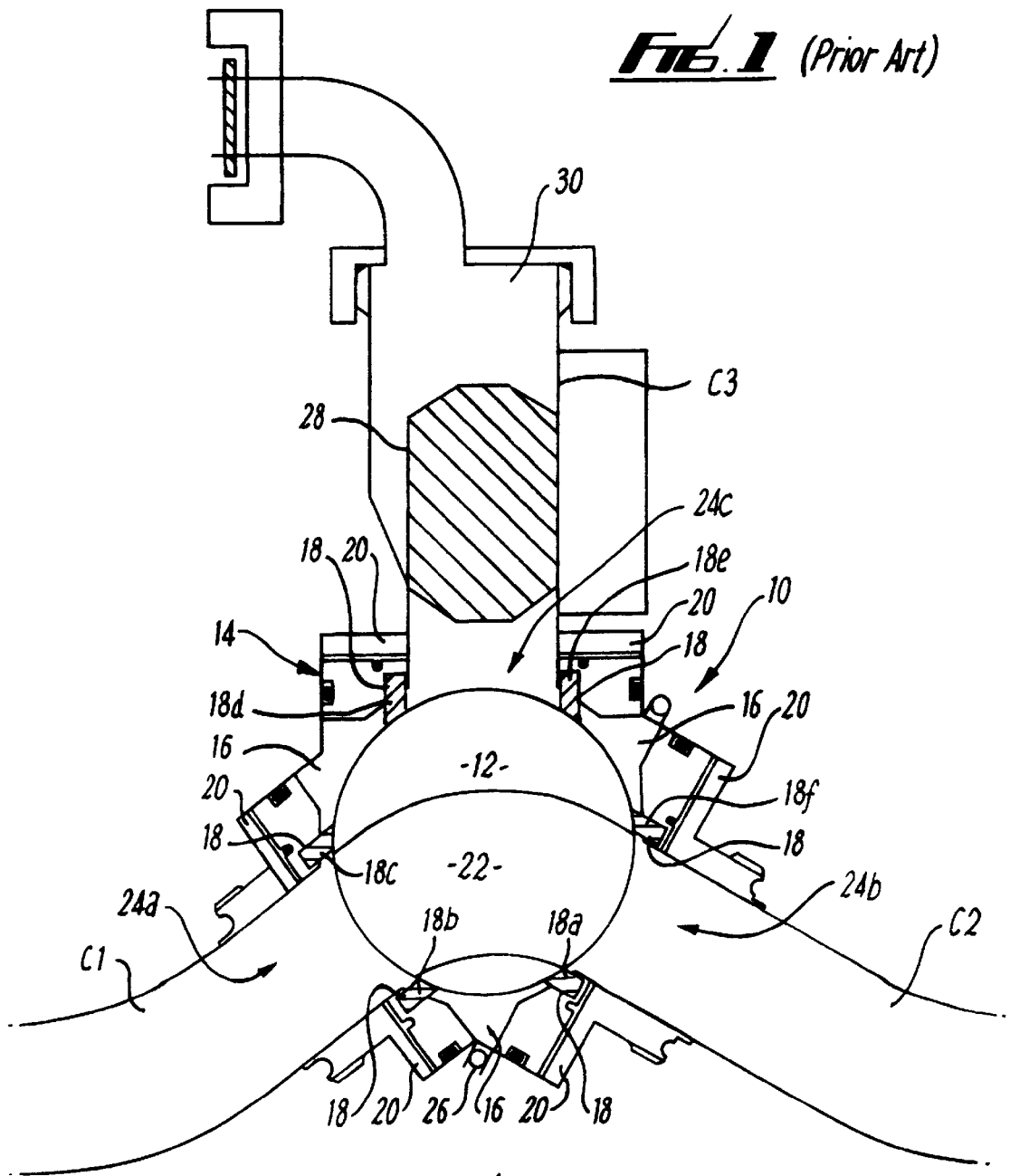
FIG. 2 is a diagrammatic cross-sectional view of a valve arrangement of the present invention in a first condition.

It will be appreciated that the cleaning fluid can be of any suitable type, and may comprise detergent, solvent, anti-bacterial agents, anti-fungal agents or comprise any other required cleaning characteristics according to the particular application and material being washed from the interior 16. The present invention provides for efficient and economical cleaning of the interior of the socket and all the seal surfaces therein, without the need for any secondary conduit to the main product conveying conduits C1,C2,C3 where appropriate. FIG. 1 illustrates a typical prior art arrangement comprising secondary conduits 52, which are expensive to manufacture and require space around the valve, which provide for problems the present invention obviates.

Whilst endeavouring in the foregoing specification to draw attention to those features of the invention believed to be of particular importance it should be understood that the applicant claims protection in respect of any patentable feature or combination of features hereinbefore referred to and/or shown in the drawings whether or not particular emphasis has been placed thereon.

What is claimed is:

1. A valve arrangement for connecting first and second conduits, the arrangement comprising:
   a) a socket defining an interior and first and second outlets for connection respectively to such first and second conduits;
   b) a valve member mounted in the socket for movement between a first condition in which a passage in the valve member communicatively connects the first and second outlets and a second condition in which the valve member passage communicatively connects the first outlet to said interior of the socket such that cleaning fluid can be passed along the first conduit for cleaning of the socket, including cleaning of said interior;
   c) the socket is arranged such that when the valve member is in the second condition fluid fed into the socket can circulate therearound to facilitate cleaning and to provide for cleaning of seal/bearing surfaces of the valve;
   d) said valve member defining a connecting passage which provides the aforesaid communicative connection; and
   e) the passage being partially aligned with the first outlet when in the second condition.

2. A valve arrangement for connecting first and second conduits, the arrangement comprising:
   a) a socket defining an interior and first and second outlets for connection respectively to such first and second conduits;
   b) a valve member mounted in the socket for movement between a first condition in which a passage in the valve member communicatively connects the first and second outlets and a second condition in which the valve member passage communicatively connects the first outlet to said interior of the socket such that cleaning fluid can be passed along the first conduit for cleaning of the socket, including cleaning of said interior;
   c) the socket is arranged such that when the valve member is in the second condition fluid fed into the socket can circulate therearound to facilitate cleaning and to provide for cleaning of seal/bearing surfaces of the valve;
   d) said valve member defining a connecting passage which provides the aforesaid communicative connection;
   e) the socket also defining a third outlet for connection to a third conduit, the valve arrangement providing for selective communication of the third outlet with the first and second outlets selectively and one at a time; and
   f) the passage being partially aligned with at least one of the first and third conduits when in the second condition, being off-set from full alignment therewith to provide for said communication with the interior of the socket.

3. A valve arrangement for connecting first and second conduits, the arrangement comprising:
   a) a socket defining an interior and first and second outlets for connection respectively to such first and second conduits;
   b) a valve member mounted in the socket for movement between a first condition in which a passage in the valve member communicatively connects the first and second outlets and a second condition in which the valve member passage communicatively connects the first outlet to said interior of the socket such that cleaning fluid can be passed along the first conduit for cleaning of the socket, including cleaning of said interior;
   c) the socket is arranged such that when the valve member is in the second condition fluid fed into the socket can circulate therearound to facilitate cleaning and to provide for cleaning of seal/bearing surfaces of the valve;
   d) first and second conduits connected respectively to the first and second outlets;
   e) the valve member defining a connecting passage which provides the aforesaid communicative connection;
   f) a third conduit, the socket defining a third outlet connected to the third conduit, the valve arrangement providing for selective communication of the third conduit with the first and second conduits selectively and one at a time;
   g) the third conduit comprising a chamber, which chamber is cleaned by cleaning fluid provided from a selected one of the first and second conduits when the valve member is in the second condition; and
   h) a conduit cleaning device stored in the third conduit, said conduit cleaning device, said passage and said second conduit being so arranged that the conduit cleaning device can pass through said passage and said second conduit to effect cleaning thereof.

4. A cleaning assembly according to claim 3 wherein the chamber provides said storage for the conduit cleaning device, which chamber can be cleaned by cleaning fluid passing into the chamber from the first conduit when the valve member is in the second condition.

5. A process for cleaning a valve arrangement for forming part of a fluid transporting system having first and second conduits, the arrangement comprising:
   a) a socket defining an interior and first and second outlets for connection respectively to said first and second conduits;
   b) a valve member defining a passage and mounted in the socket for movement between a first condition in which the passage communicatively connects the first and second outlets and a second condition in which the passage communicatively connects the first outlet to the interior of the socket;
   c) the process comprising positioning the valve member in said second condition, and directing cleaning fluid through the first conduit to pass said cleaning fluid to the interior of the socket to clean said interior;
   d) isolating the second conduit when the valve member is in the second condition;
   e) the socket defining a third outlet for connection to a third conduit and the method includes selectively communicating the third outlet with a selected of the first and second outlets; and
   f) partially aligning the passage with at least one of the first and third conduits when the valve member is in the second condition, said partial alignment being off-set from full alignment therewith to provide for said communication with the interior of the socket.

6. A valve arrangement for connecting first and second conduits, the arrangement comprising:

a) a socket defining an interior and first, second and third outlets the first and second outlets being for connection respectively to said first and second conduits;
b) the socket also defining a chamber for a pipeline evacuating device connected to the third outlet;
c) a valve member mounted in the socket for movement between a first condition in which the valve member communicatively connects a selected one of the first and second outlets to said interior of the socket and to the third outlet such that cleaning fluid can be passed along the selected one of the first and second conduits for cleaning of the socket, including cleaning of said interior and said chamber; and
d) the passage being partially aligned with at least one of the first and third outlets when in the second condition and being off-set from full alignment therewith to provide for said communication with the interior of the socket.

* * * * *